March 24, 1931.    E. LINHART    1,797,352
CHAIN CONSTRUCTION
Filed April 11, 1929
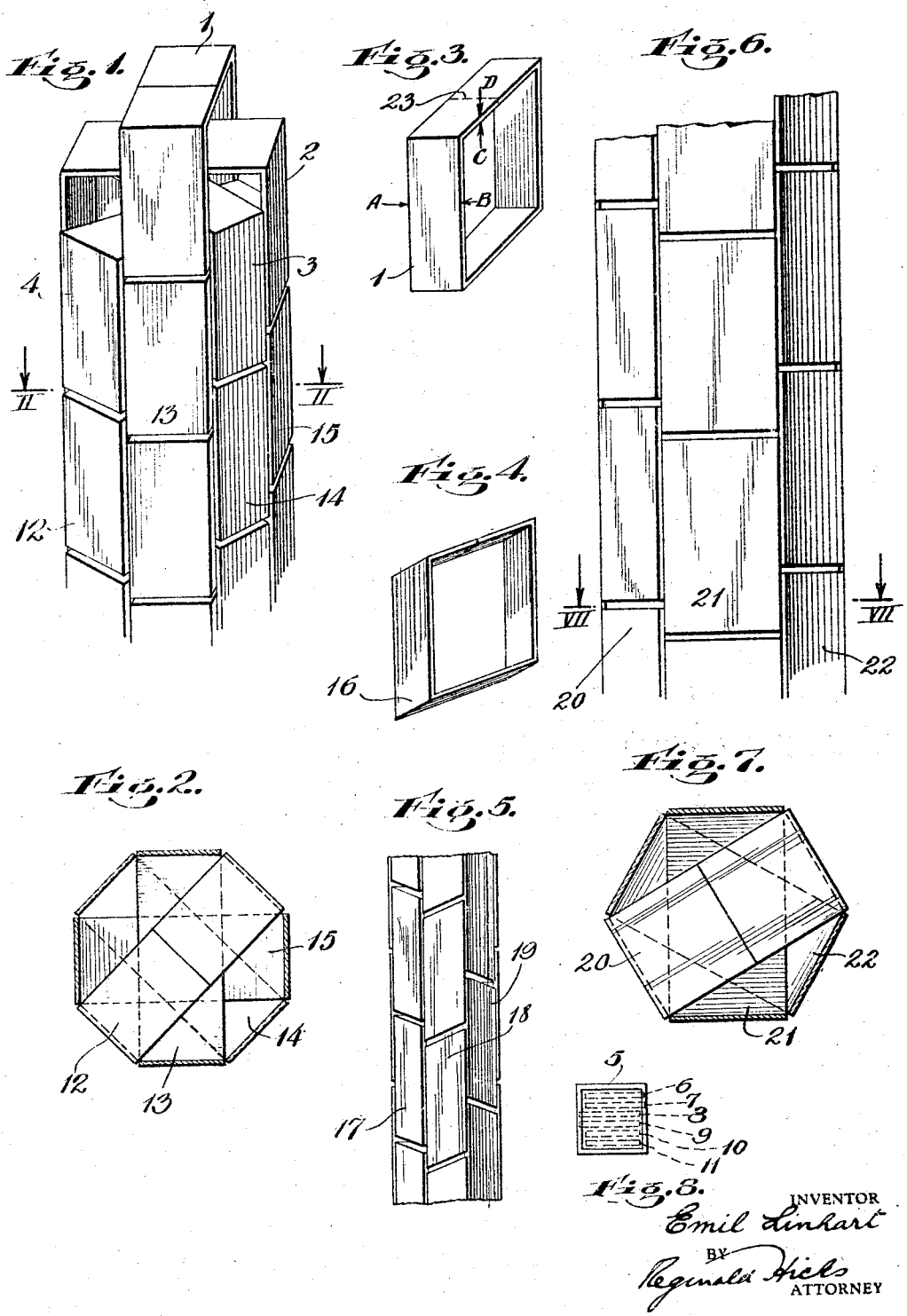

Patented Mar. 24, 1931

1,797,352

UNITED STATES PATENT OFFICE

EMIL LINHART, OF WEST NEW YORK, NEW JERSEY

CHAIN CONSTRUCTION

Application filed April 11, 1929. Serial No. 354,186.

The invention relates to chains primarily suited for ornamental purposes, such as the wristlets of ladies' watches and articles of jewelry in general, and contemplates a novel organization of links so interconnected as to give the chain a general appearance of solidity without requiring a foundation wire or chain, and at the same time possessed of ample flexibility for the purposes mentioned and others which will readily suggest themselves. The invention further provides a wide variety in design according to the shape of the individual links and their order of assembly and, in its preferred form, in addition to the foregoing, provides a chain having a smooth surface which may be readily cleaned and which is of a generally pleasing appearance, as will presently appear.

These and other features of the invention will be readily understood from the following description and the accompanying drawings which are on an enlarged scale and which, except as otherwise indicated herein, illustrate the mode of construction and organization rather than the proportions or details of the links, the latter being subject to considerable change without departing from the spirit of the invention.

In the drawings, Fig. 1 is a perspective view of a preferred form, somewhat expanded; Fig. 2 a section on the line II—II of Fig. 1; Fig. 3 a perspective view of an individual link as used in the chain illustrated in Fig. 1; Fig. 4 a perspective view of a modified form of link; Fig. 5 an elevation of a length of chain assembled from links of the form of Fig. 4; Fig. 6 a further modification; Fig. 7 a section on the line VII—VII of Fig. 6; and Fig. 8 a detail, on a smaller scale, of the chain shown in Fig. 1.

Referring to Figs. 1, 2, and 3, it will be seen that the chain comprises a plurality of similar links 1, each of rectangular form and bent up from strip material. This I have found to be particularly suited, although not essential, to the carrying out of my invention, because it permits the use of a metal such as platinum, which, as is well known, is difficult to work on account of its hardness, although that very property makes it desirable for jewelry. Each of the links embraces or enters at least four adjacent links, two or more at each end, the form illustrated in Figs. 1 and 2 having four links per unit chain length, which means that each link, at each end, embraces three adjacent links. In Fig. 1 the links embraced by link 1 are numbered 2, 3, and 4, these four links being considered as constituting a unit length of chain. As will be understood, each of them in turn enters six other links, three at each end.

According to the number of links in each unit of length, the width A—B (Fig. 3) of the links, which in this case is the width of the strip, is such that a substantially closed and regular section is provided, as shown in Fig. 2, in this form the section being octagonal. If desired, a closer approximation to circular section may be obtained by rubbing down the outer longitudinal edges of the assembled links or appropriately shaping them before assembling, as will be understood.

In order to prevent undue longitudinal movement of the links relatively to each other, and so preserve the appearance of solidity, the space enclosed by each link, measured longitudinally of the chain, is arranged to be substantially filled by the ends of the links which it embraces. Fig. 8, which is more or less diagrammatic, illustrates this feature. In this figure, the numeral 5 indicates any one of the links of the form of chain shown in Fig. 1, and the numerals 6, 7, 8, 9, 10, and 11 indicate the ends or cross bars of the links embraced by link 5, this form, as above explained, being such that each link embraces six others, three at each end. In other words the "filling" of the links is accomplished by suitably proportioning the thickness C—D (Fig. 3) of the links to their length, according to the number of links per unit chain length.

I have found that a chain thus constructed possesses considerable strength and, by reason of its smooth surface, is very readily cleaned should the metal from which it is made become tarnished or require special polishing. Furthermore, the chain is quite flexible even though the spaces between pairs of links are very small, due to the fact that each link is free of and accordingly movable somewhat relatively to all the others.

In assembling the links, as will now be apparent, the design marked out on the surface of the chain by the interstices of the links is determined by the order in which the links are connected. For example, if the links are assembled in continuous series spirally of the chain the transverse interstices produce a continuous stepped effect, whereas if the links are assembled as shown in Fig. 1 a more or less irregular "brick-wall" effect is produced. The order of assembly in the latter case is apparent from an inspection of Fig. 2 in which the numerals 12, 13, 14, and 15 indicate the ends or cross bars of the correspondingly numbered links in Fig. 1.

Fig. 4 illustrates a link 16 which is of parallelogrammic form other than rectangular and Fig. 5 a length of chain assembled from such links. As in the previous form the surface design is determined by the order and manner of assembling the links, the drawing showing the links 17, 18, and 19 in an alternate right and left-hand arrangement. Except that in a chain of this form the links engage in line instead of surface contact the mode of construction is generally the same as that already described.

Fig. 6 illustrates another form of chain constructed in accordance with the principles of my invention but having three links per unit length, as distinguished from the form of Fig. 1. The links are of rectangular form and are assembled as indicated in Fig. 7, in which the numerals 20, 21, and 22 designate the correspondingly numbered links of Fig. 6.

In each form, however, it will be observed that the links which overlap each other longitudinally of the chain and are adjacent to each other circumferentially (for example, links 2 and 3 in Fig. 1) lie in planes other than at right angles to each other, being so positioned by the remaining links. In other words, the chain comprises a plurality of series of longitudinally aligned links, each series lying in a plane other than at right angles to the adjacent series.

Numerous changes and variations in the form and manner of assembly of the links will readily suggest themselves without further description, the closure of the links as they are assembled being accomplished as best befits their form and the material of which they are made. I have found that when the links are bent up from strip material, as here illustrated, their ends are best united by soldering at the junction indicated by the dotted line 23 in Fig. 3, which portion of the link is of course concealed by the succeeding links. If the links are of relatively large size, or otherwise possess sufficient stiffness, their ends need not be united, as will be understood.

Having now described my invention, I claim:

1. A chain comprising a plurality of pairs of links having substantially flat, circumferentially adjacent exposed surfaces, the links of each pair overlapping each other longitudinally of the chain and said surfaces lying in planes other than at right angles to each other.

2. A chain comprising a plurality of series of longitudinally aligned links, each series lying in a plane other than at right angles to the adjacent series and each link of each series embracing four or more adjacent links, said links being so arranged that any transverse section of the chain is a closed polygon.

3. A chain comprising a plurality of links, each of strip material and embracing four or more adjacent links, two or more at each end, successive links arranged in planes other than at right angles to each other and so that the chain is of substantially closed section throughout its length.

4. A chain comprising a plurality of links, each of strip material bent to parallelogrammic form and embracing four or more adjacent links, two or more at each end, the ends of said links of a thickness to substantially fill the interior of the link which embraces them and the sides of said links of a width to produce a substantially closed transverse section throughout the length of the chain.

In testimony whereof, I have signed this specification.

EMIL LINHART.